United States Patent
Antonio

(10) Patent No.: US 6,426,960 B2
(45) Date of Patent: *Jul. 30, 2002

(54) INCREASED CAPACITY DATA TRANSMISSION IN A CDMA WIRELESS COMMUNICATION SYSTEM

(75) Inventor: Franklin P. Antonio, Del Mar, CA (US)

(73) Assignee: QUALCOMM Incorporated, San Diego, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/881,552

(22) Filed: Jun. 24, 1997

(51) Int. Cl.[7] .................................................. H04J 1/16
(52) U.S. Cl. ..................... 370/477; 370/320; 370/335; 370/342; 370/441
(58) Field of Search ................................. 370/320, 335, 370/342, 441, 477; 375/200; 455/422, 511, 512, 517, 522, 68, 69

(56) References Cited

U.S. PATENT DOCUMENTS

| | | | |
|---|---|---|---|
| 4,112,257 A | 9/1978 | Frost | 179/2 EB |
| 4,123,718 A | 10/1978 | Lampert et al. | 325/474 |
| 4,765,753 A | 8/1988 | Schmidt | 379/60 |
| 4,777,653 A | 10/1988 | Bonnerot et al. | 455/69 |
| 4,811,421 A | 3/1989 | Havel et al. | 455/69 |
| 4,868,795 A | 9/1989 | McDavid et al. | 367/77 |
| 4,870,408 A * | 9/1989 | Zdunek et al. | 370/431 |
| 4,870,698 A | 9/1989 | Katsuyama et al. | 455/67 |
| 4,901,307 A | 2/1990 | Gilhousen et al. | 370/18 |
| 5,056,109 A | 10/1991 | Gilhousen et al. | 375/1 |
| 5,093,840 A | 3/1992 | Schilling | 375/1 |
| 5,101,501 A | 3/1992 | Gilhousen et al. | 455/33 |

(List continued on next page.)

FOREIGN PATENT DOCUMENTS

| | | | |
|---|---|---|---|
| WO | 9406218 | 3/1994 | H04Q/7/04 |
| WO | 9604718 | 2/1996 | |
| WO | 9703403 | 1/1997 | |

*Primary Examiner*—Wellington Chin
*Assistant Examiner*—Frank Duong
(74) *Attorney, Agent, or Firm*—Philip Wadsworth; Kent D. Baker; Byron Yafuso

(57) ABSTRACT

A method and apparatus for transmitting voice and data in a code division multiple access (CDMA) wireless telecommunications system is described. In an exemplary embodiment of the invention, a base station transmits voice information at a voice transmit power and data at a data transmit power that is equal to a maximum transmit power minus the voice transmit power. In a preferred embodiment of the invention, each base station reports the voice transmit power to a base station controller in 20 ms intervals. The base station controller responds by calculating an available data transmit capacity, and by forwarding data to each base station equal to the available data transmit capacity. Each base station then transmits all voice data at the current voice transmit power, and data at the current data transmission power. If the amount of data received exceeds the capacity provided by the current data transmission power, some data is not transmitted. The base station then notifies the base station controller if data was not transmitted, and the base station controller attempts to retransmit the data at a later time.

21 Claims, 3 Drawing Sheets

U.S. PATENT DOCUMENTS

| | | | |
|---|---|---|---|
| 5,103,459 A | 4/1992 | Gilhousen et al. | 375/1 |
| 5,107,487 A | 4/1992 | Vilmur et al. | 370/18 |
| 5,128,965 A | 7/1992 | Henriksson | 375/58 |
| 5,204,876 A | 4/1993 | Bruckert et al. | 375/1 |
| 5,220,678 A | 6/1993 | Feei | 455/69 |
| 5,245,629 A | 9/1993 | Hall | 375/1 |
| 5,257,293 A | 10/1993 | Gilhousen et al. | 375/1 |
| 5,265,119 A | 11/1993 | Gilhousen et al. | 375/1 |
| 5,267,262 A | 11/1993 | Wheatley, III | 375/1 |
| 5,305,468 A | 4/1994 | Bruckert et al. | 455/69 |
| 5,313,467 A * | 5/1994 | Varghese et al. | 370/431 |
| 5,383,219 A | 1/1995 | Wheatley, III et al. | 375/1 |
| 5,390,338 A | 2/1995 | Bodin et al. | 455/33.1 |
| 5,450,616 A | 9/1995 | Rom | 455/69 |
| 5,465,399 A | 11/1995 | Oberholtzer et al. | 455/69 |
| 5,487,180 A | 1/1996 | Ohtake | 455/54.1 |
| 5,511,073 A * | 4/1996 | Padovani et al. | 370/335 |
| 5,515,375 A * | 5/1996 | DeClerck | 370/335 |
| 5,568,483 A | 10/1996 | Padovani et al. | 370/84 |
| 5,909,434 A * | 6/1999 | Odenwalder et al. | 370/342 |
| 5,987,326 A * | 11/1999 | Tiedemann, Jr. et al. | 455/442 |
| 6,002,677 A * | 12/1999 | Javitt et al. | 370/329 |
| 6,028,892 A * | 2/2000 | Barabash et al. | 455/422 |

* cited by examiner

INCREASED CAPACITY DATA TRANSMISSION IN A CDMA WIRELESS COMMUNICATION SYSTEM

BACKGROUND OF THE INVENTION

I. Field of the Invention

The present invention relates to wireless communications. More particularly, the present invention relates to a novel and improved method and apparatus for transmitting voice and data in a code division multiple access (CDMA) wireless telecommunications system.

II. Description of the Related Art

One measure of the usefulness of a wireless communication system is the efficiency with which it uses the available RF bandwidth. In some instances, efficiency is defined as the sustainable data transmission rate of a system over a given amount of RF bandwidth. In other instances, efficiency is characterized as the total number of communications (such as telephone calls) that can be simultaneously conducted using a given amount of bandwidth. Whatever the measure, increasing efficiency generally increases the usefulness of a wireless communication system.

An example of an especially efficient, and therefore especially useful, wireless communication system is shown in FIG. 1, which is a highly simplified illustration of a wireless cellular telephone system configured in accordance with the IS-95 over-the-air interface standard adopted by the Telecommunications Industry Association (TIA). The IS-95 standard and its derivatives such as IS-95-A etc. (referred to herein collectively as the IS-95 standard) define a set of code division multiple access (CDMA) signal processing techniques for implementing a cellular telephone system. A cellular telephone system configured substantially in accordance with the IS-95 standard is described in U.S. Pat. No. 5,103,459 entitled "SYSTEM AND METHOD FOR GENERATING SIGNAL WAVEFORMS IN A CDMA CELLULAR TELEPHONE SYSTEM" assigned to the assignee of the present invention and incorporated herein by reference.

In accordance with the IS-95 standard, subscriber units 10a–c (usually cellular telephones) conduct telephone calls and other communications by interfacing with one or more base stations 12 using the CDMA modulated RF signals. Each interface is comprised of a forward link signal transmitted from the base station 12 to the subscriber unit 10, and a reverse link signal transmitted from the subscriber unit 10 to the base station 12.

Base station controllers (BSC) 14 perform various functions that allow mobile communication to take place including orchestrating the handoff of a subscriber unit 10 between two base stations 12. Mobile switching center (MSC) 16 provides call processing and routing functionality to allow communication with public switched telephone network (PSTN) 18.

The use of CDMA modulation techniques as specified by the IS-95 standard makes each RF signal appear as background noise during the processing of any particular RF signal. Making other signals appear as background noise allows transmission of multiple RF signals over the same RF bandwidth. Transmitting multiple signals over the same RF bandwidth increases the frequency reuse of the cellular telephone system, which in turn increases the overall capacity.

To further increase overall system capacity, IS-95 varies the average transmit power of a signal in response to changes in voice activity. The average transmit power is varied in 20 ms increments, either by a reduction in the transmit duty cycle, or an actual transmit power reduction. By varying the average transmit power in response to voice activity, the average total power used by the RF signal to conduct communication is reduced.

Because voice activity is essentially random, however, the total transmit power of an IS-95 compliant base station varies over time in response to changes in voice activity. Thus, when voice activity is low, or few conversations are being conducted, the base station will transmit data at much less than its maximum rate, leaving valuable bandwidth unused.

Furthermore, varying transmit power with voice activity creates a degree of uncertainty as to the total transmit power that will be used at any particular instant. To account for this uncertainty, IS-95 compliant base stations typically transmit at less than the maximum rate to establish reserve transmit power for handling bursts of increased speech activity. Maintaining this reserve, however, also causes the average transmission rate to be less than the maximum transmission rate of which base station is capable.

In any case, transmitting at an average rate that is less than the maximum rate is undesirable, as it does not utilize the available RF bandwidth as efficiently as possible. To increase the usefulness of a CDMA wireless communication system, the present invention is directed towards allowing the average data transmission rate to more closely equal the maximum transmission capacity of a base station 12, and therefore towards increasing the efficiency with which the allocated RF bandwidth is used.

SUMMARY OF THE INVENTION

The present invention is a novel method and apparatus for transmitting voice and data in a code division multiple access (CDMA) wireless telecommunications system. In an exemplary embodiment of the invention described herein, a base station transmits voice information at voice transmit power and data at a data transmit power that is equal to a maximum transmit power minus the voice transmit power. In a preferred embodiment of the invention, each base station reports the voice transmit power to a base station controller in 20 ms intervals. The base station controller responds by calculating an available data transmit capacity, and by forwarding data to each base station equal to the available data transmit capacity. Each base station then transmits all voice data at the current voice transmit power, and data at the current data transmission power. If the amount of data received exceeds the capacity provided by the current data transmission power, some data is not transmitted. The base station then notifies the base station controller data was not transmitted, and the base station controller attempts to retransmit the data at a later time.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
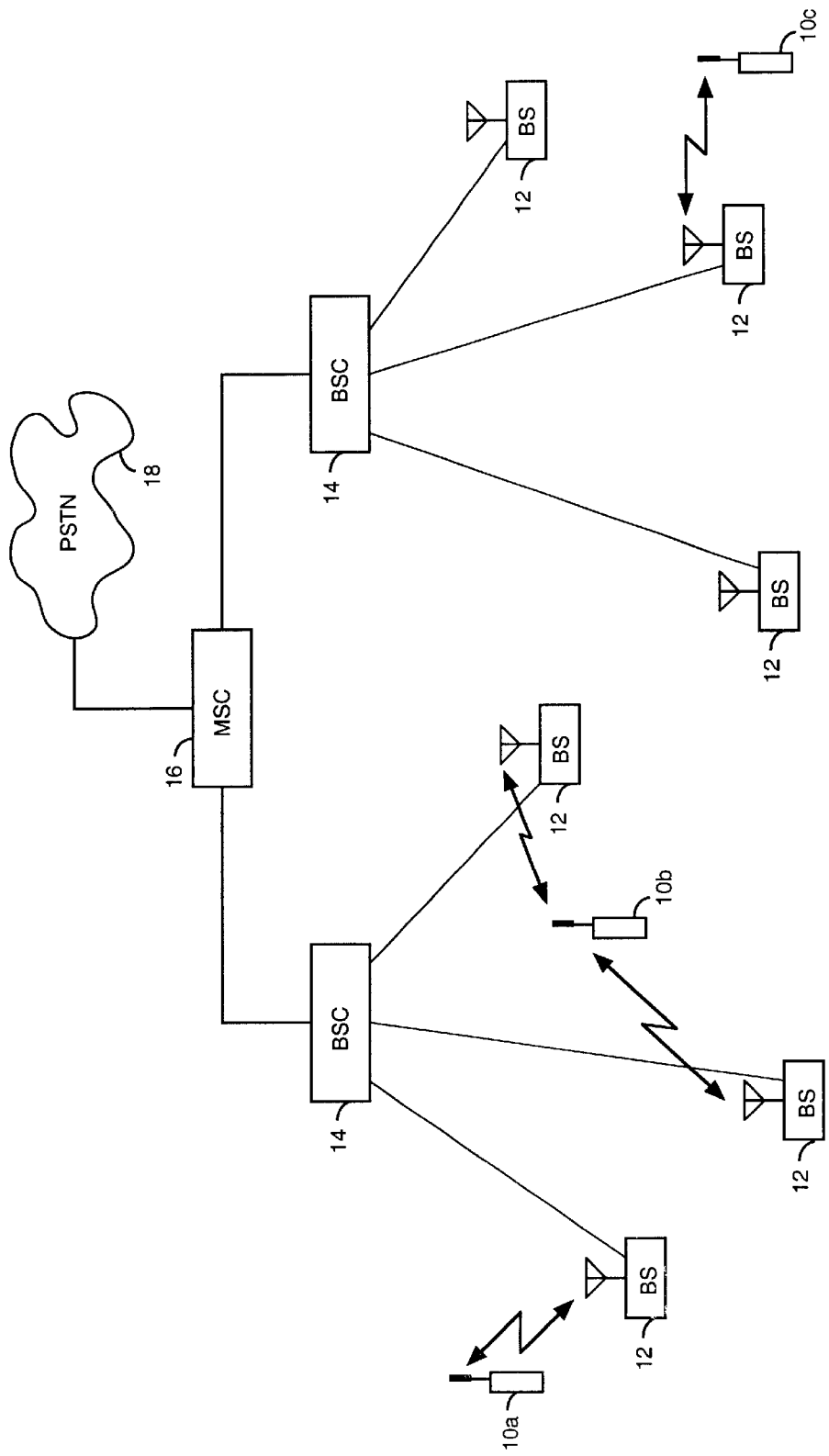
FIG. 1 is block diagram of a cellular telephone system.
Figure 2:
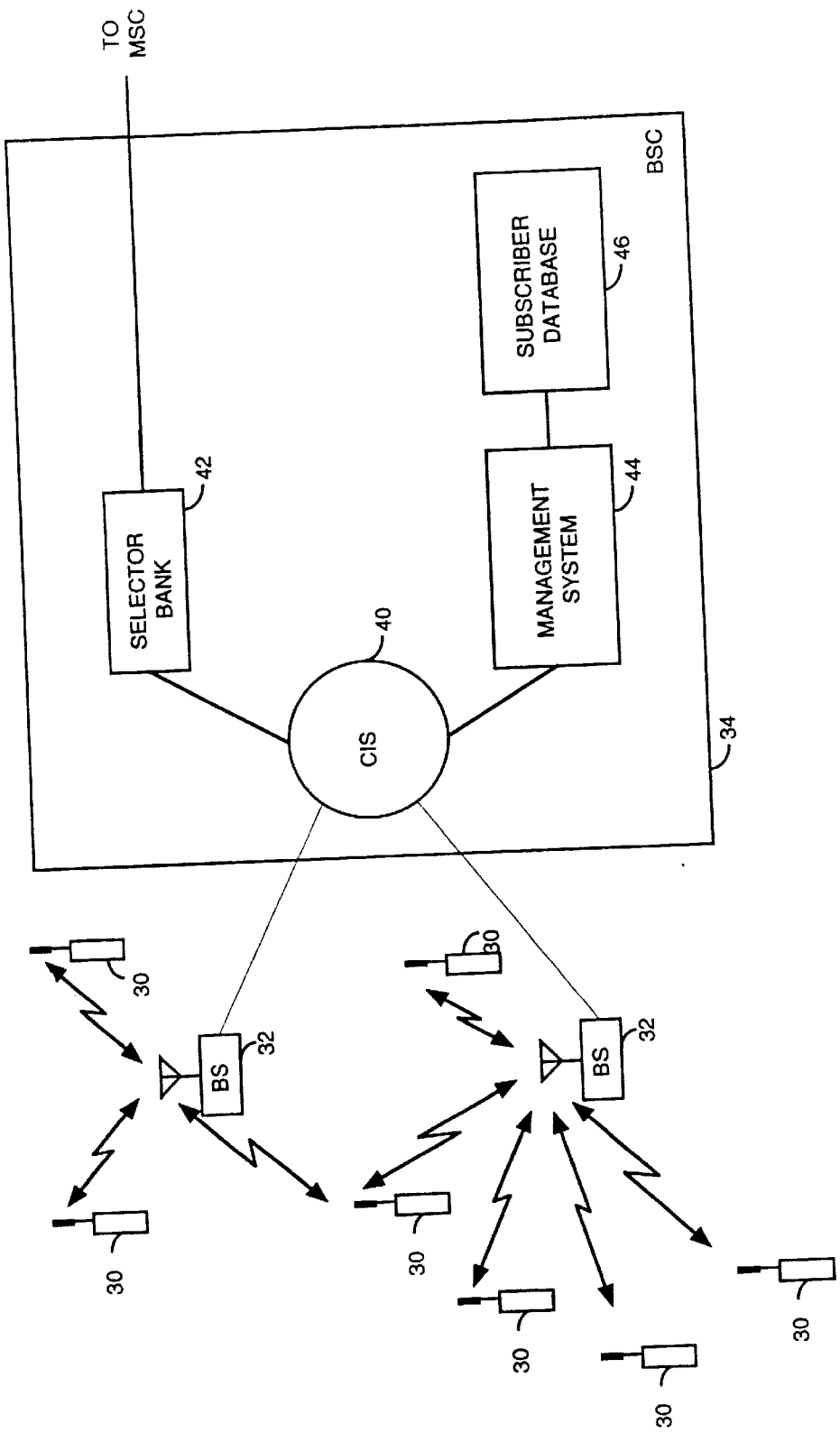
FIG. 2 is a block diagram of a cellular telephone system configured in accordance with one embodiment of the invention.

FIG. 2 is a block diagram of a portion of a cellular telephone system including a base station controller (BSC) 34, a pair of base stations 32, and a set of subscriber units 30 configured in accordance with one embodiment of the invention. Subscriber units 30 conduct telephone calls by establishing bidirectional RF links with base stations 32. The bidirectional links are comprised of a forward link signal transmitted from each base station 32, and a reverse link signal transmitted from each subscriber unit 30.

In a preferred embodiment of the invention, the forward and reverse link signals are processed in accordance with the IS-95 over-the-air interface standard, which calls for the use of CDMA signal processing. CDMA signal processing allows multiple spread spectrum RF signals to be transmitted at the same RF frequency range via modulation and demodulation with a set of pseudorandom noise (PN) codes.

Each base station 32 conducts communications with multiple subscriber units 30 by generating a set of forward link signals. (The term "forward link signal" is also used to describe a set of forward link signals transmitted from a base station 32, however, for the purpose of describing the present invention, forward link signal refers to a forward link transmission used for a single traffic channel.) Additionally, each base station 32 receives a set of reverse link signals from a set of subscriber units 30.

The number of forward link signals that can be transmitted simultaneously by a base station 32 is typically limited by the maximum transmit power capability ($P_{max}$) of the particular base station 32, the amount of multipath generated, or a predetermined limit set in response to a network plan. The number of reverse link signals is typically limited by the bit energy to noise ratio ($E_b/N_0$) required by a base station 32 to properly process a particular reverse link signal.

The IS-95 standard also calls for the data transmitted over the forward and reverse link signals to be processed in 20 ms increments that correspond to frames. Within BSC 34 and base stations 32, the various subsystems shown exchange the frames, as well as control information such as signaling messages, via the use of packets. The packets contain an address that indicates the subsystem to which they are directed, so that they may be properly routed by CDMA interconnect subsystem (CIS) 40. Management system 44 controls the configuration and operation of the other systems that make up BSC 34 via signaling messages also transmitted using packets using information stored in subscriber database 46.

In accordance with the IS-95 standard, a subscriber unit 30 can enter soft handoff, as shown in FIG. 2, whereby two or more bidirectional RF links are simultaneously established with two or more corresponding base stations 32. Soft handoff allows a subscriber unit 30 to move from the coverage area of one base station 32 to the coverage area of another base station 32 while maintaining at least one bidirectional link at all times. Soft handoff can be contrasted with hard handoff during which the first bidirectional interface is terminated before the second bidirectional interface is established.

To conduct soft handoff, a set of selectors (not shown) within selector bank 42 performs various functions including performing call distribution and call selection functions used for conducting soft handoff, as well as tracking the base station or stations 32 with which a subscriber unit 30 is interfacing at any given time. The selectors are preferably comprised of a set of software instructions running on one or more microprocessors.

Call distribution involves generating copies of each frame directed to the subscriber unit 30 in soft handoff (usually received from MSC 16), and forwarding one copy of the frame to each base station 32 interfacing with that subscriber unit 30. Thus, one copy of the frame is transmitted from each base station 32.

Call selection involves receiving a set of frames from the set of base stations 32 interfacing with the subscriber unit 30 during the soft handoff, and selecting one frame for further processing based on the integrity or quality of the frames. The selected frame is generally forwarded to the MSC 16 for introduction into PSTN 18.

In accordance with the preferred embodiment of the invention, base stations 32 receive two types of frames from BSC 34 during the processing of a set of voice phone calls and data communications: frames containing voice information (voice frames) and frames containing data information (data frames). Each base station 32 responds to the two types of frames by transmitting all the voice frames received at a total transmit power $P_{voice}$, and by transmitting a set of data frame at a total transmit power $P_{data}$ that is less than or equal to $P_{max}-P_{voice}$.

By transmitting data frames in addition to voice frames, the average power at which the base station transmits is increased with respect to a base station transmitting only voice frames. In particular, the base station 32 transmits more closely to its maximum transmit power $P_{max}$ at any given instant. This increases the average transmit power and therefore increases the total amount of information that is transmitted by the base station 32. Increasing the total amount of information transmitted, in turn, increases the efficiency with which the base station 32 uses the available RF bandwidth. Furthermore, by transmitting data frames at a transmit power that is less than or equal to $P_{max}-P_{voice}$, the average transmit power of a base station 32 is increased without interfering with the set of voice communications already being conducted.

Figure 3:
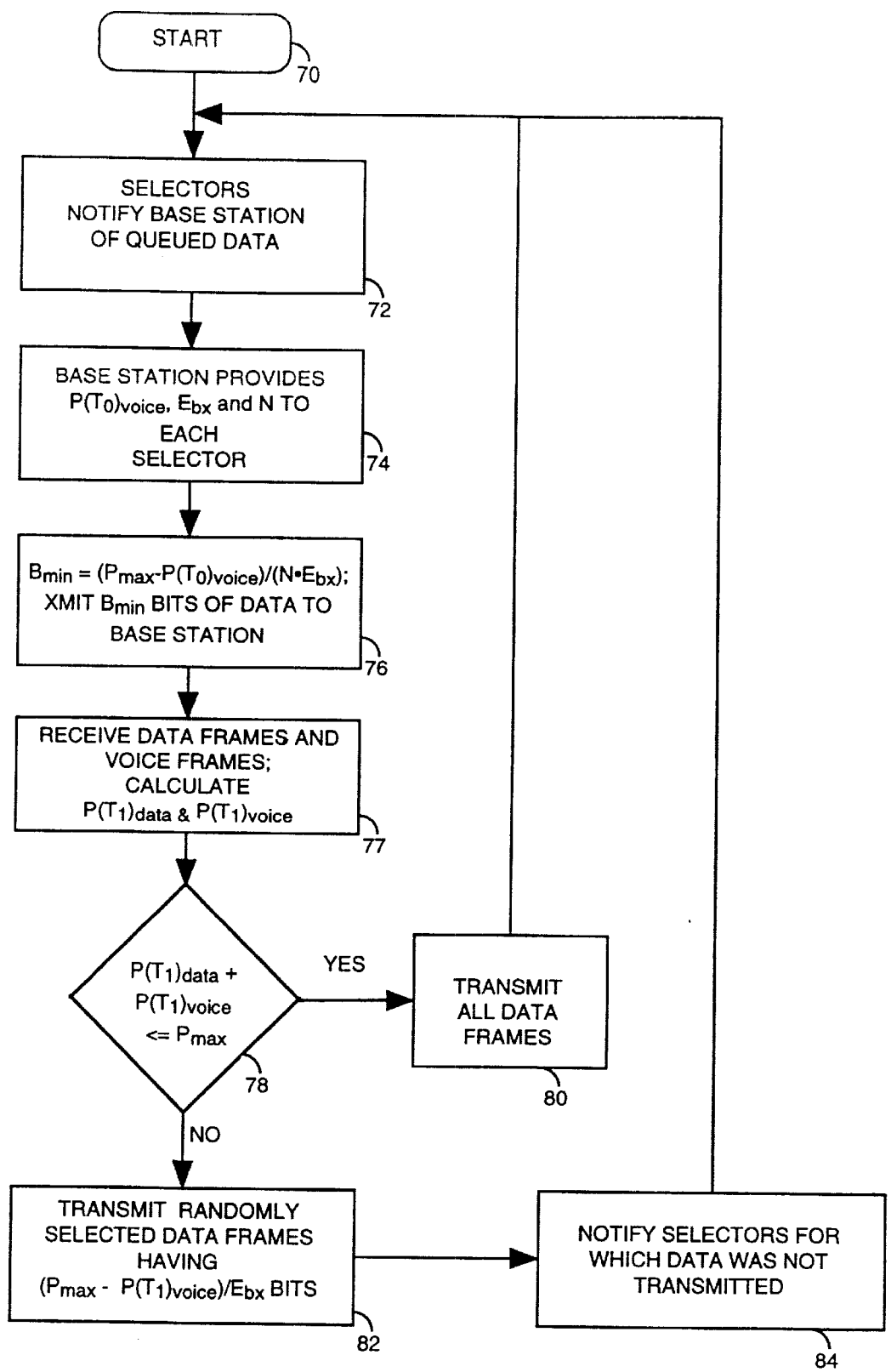
FIG. 3 is a flow diagram illustrating the operation of a cellular telephone system configured in accordance with one embodiment of the invention.

FIG. 3 is a flow chart illustrating the steps performed by BSC 34 and base stations 32 during the processing of voice and data frames in accordance with one embodiment of the invention. The processing begins at step 70, and at step 72 a set of selectors within selector bank 42 notifies the base stations 32 when they have data queued for transmissions via the use of signaling messages transmitted to subscriber unit 30. The data frames are received from MSC 16 and are directed to a subscriber unit 30. In one embodiment of the invention, the data frames are distinguished from voice data files via the use of one or more status bits contained in each frame.

At a time $T_0$, each base station 32 receives a set of the signaling messages from the selectors, and calculates a value N equal to the number of selectors having a data frame queued for transmission. Additionally, each base station 32 calculates a value $E_{bx}$ equal to the average energy used to transmit a bit of data, as well as a value $P(T_0)_{voice}$ equal to the transmit power used at time $T_0$ to transmit all the voice frames being processed.

At step 74, each base. station transmits the values N, $E_{bx}$ and $P(T_0)_{voice}$ to each selector having data frames queued for transmission. At step 76, each selector calculates a value $B_{min}$ as the minimum of a set of values $B(1)_{bs} \ldots B(n)_{bs}$ where $B(n)_{bs}=(P_{max}-P(T_0)_{voice})/(N \cdot E_{bx})$ for a base station 32, n being used to conduct the associated telephone call. That is, if the subscriber unit involved in the telephone call is in a soft handoff involving two base stations 32, two values $B(1)_{bs}$ and $B(2)_{bs}$ are calculated, and $B_{min}$ is set to the lower of $B(1)_{bs}$ and $B(2)_{bs}$. In an alternative embodiment of the invention, $B_{min}$ is set to the higher of $B(1)_{bs}$ and $B(2)_{bs}$.

Once $B_{min}$ has been calculated, the selector transmits a data frame having $B_{min}$ bits of data to each base station 32 involved in the call.

At step 77 occurring at a time $T_1$ which is after time $T_0$, each base station 32 receives a set of data frames and a set of voice frames from the selectors, and calculates a value $P(T_1)_{data}$ equal to the power necessary to transmit the data frames received, as well as a value $P(T_1)_{voice}$ equal to the power necessary to transmit the voice frames received. Using $P(T_1)_{data}$ and $P(T_1)_{voice}$, each base station 32 determines if $P(T_1)_{data} + P(T_1)_{voice}$ is less than or equal to the maximum transmit power $P_{max}$ of the base station 32 at step 78. That is, each base station 32 determines if $P(T_1)_{data} + P(T_1)_{voice} <= P_{max}$. If so, all the data frames are transmitted along with the voice frames at step 80, and then the base station 32 returns to step 72. While the use of $P_{max}$ is preferred, the use of other thresholds less than $P_{max}$ is consistent with the use of the present invention.

If a base station determines at step 78 that $P(T_1)_{data} + P(T_1)_{voice}$ is greater than the maximum transmit power $P_{max}$, the base station 32 transmits a set of randomly selected data frames having $(P_{max} - P(T_1)_{voice})/E_{bx}$ bits of data at step 82. Then, at step 84 the base station 32 notifies the selectors which did not have their data frames transmitted. These selectors can then attempt to retransmit the data contain in these data frames at a later time.

Generally, most or all of the data frames received by a base station 32 will be transmitted at time $T_1$ because the transmit power used to transmit the voice frames at time $T_0$ will differ little from the necessary voice frame transmit power at time $T_1$. Thus, if any demand to transmit data exists, base station 32 will transmit, on average, more closely to the maximum power level. This allows the cellular telephone system to more efficiently use the available RF bandwidth.

When the transmit power necessary at time $T_1$ to transmit all the voice frames increases relative to the transmit power necessary at $T_0$, the present invention limits the transmission of data frames to that which will cause $P_{max}$ power to be used, while allowing all voice frames to be transmitted. This ensures that all the telephone calls being conducted will continue without interruption, while also allowing the maximum number of data frames to be transmitted given the maximum transmit power $P_{max}$ of a base station 32.

In an embodiment of the invention, voice frames are transmitted at a voice transmit power and data frames are transmitted at a data transmit power. The number of queued frames is determined, and an available number of bits per frame is determined using the number of queued frames, an available transmit power, and an energy per bit value. The number of queued frames is provided each having said available number of bits per frame.

In an embodiment of the invention, voice frames are transmitted, and data frames are transmitted if additional capacity exists. At a first time, the base station indicates the additional capacity to the base station controller, and the base station controller sets the amount of data in the set of data frames based on the additional capacity. At a second time, if the additional capacity is less than the amount of transmit power necessary to transmit all of the set of data frames, then the base station transmits a portion of the set of voice frames and notifies the base station controller that a portion of the set of voice frames was not transmitted.

Thus, a novel and improved method and apparatus for transmitting voice and data in a code division multiple access (CDMA) wireless telecommunication system is described. The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A method for performing wireless communications using a device having a transmit power threshold, the method comprising:
   a) transmitting voice information at a voice transmit power;
   b) transmitting data at a data transmit power that is less than or equal to the transmit power threshold minus said voice transmit power, without interfering with said transmitting voice information, wherein said step of transmitting data further comprising the steps of:
   b1) receiving a set of data frames;
   b2) calculating an amount of power necessary to transmit all of said set of data frames;
   b3) transmitting all of said data frames it said amount of power is less than the transmit power threshold minus the voice transmit power; and
   b4) transmitting a portion of said data frames if said amount of power is greater than the transmit power threshold minus the voice transmit power.

2. The method of claim 1 wherein the device is a base station and further comprising calculating the data transmit power and transferring a data transmit power value from a base station controller to the base station.

3. The method of claim 1 wherein the device is a base station and further comprising transferring a message from the base station to a base station controller indicating that all of the data was not transmitted.

4. The method of claim 1 wherein transmitting the voice information and the data comprises using code division multiple access.

5. The method of claim 1 further comprising distinguishing between voice information and data based on a status bit.

6. The method of claim 1 wherein the transmit power threshold is a maximum transmit power capability of a base station.

7. A method for performing wireless communications using a device having a transmit power threshold, the method comprising:
   a) transmitting voice information at a voice transmit power;
   b) transmitting data at a data transmit power that is less than or equal to the transmit power threshold minus said voice transmit power, without interfering with said transmitting voice information;
   c) determining a number of queued frames;
   d) determining an available number of bits per frame using said number of queued frames, an available transmit power, and an energy per bit value; and e) providing said number of queued frames, each having said available number of bits per frame.

8. A system for conducting wireless communications comprising:

a base station controller for transmitting a set of data frames and a set of voice frames; and a base station for transmitting said set of voice frames and for transmitting at least a portion of said set of data frames when additional capacity exists, without interfering with transmitting said set of voice frames, wherein said additional capacity exists if additional transmit power is available while said voice frames are being transmitted.

9. A system for conducting wireless communications comprising:

a base station controller for transmitting a set of data frames and a set of voice frames; and a base station for transmitting said set of voice frames and for transmitting at least a portion of said set of data frames when additional capacity exists, without interfering with transmitting said set of voice frames, wherein said base station is further for indicating a first time additional capacity to said base station controller, and said base station controller is for setting said set of data frames to have an amount of data equal to said first time additional capacity.

10. The system as set forth in claim 9 wherein said base station transmits a portion of said set of voice frames if a second time additional capacity is less than an amount of transmit power necessary to transmit all of said set of data frames.

11. The system as set forth in claim 10 wherein said base station notifies said base station controller of a portion of said set of voice frames that were not transmitted.

12. A system for conducting wireless communications comprising:

means for generating a set of data frames and a set of voice frames; and means for transmitting said set of voice frames and for transmitting at least a portion of said set of data frames when additional capacity exists, without interfering with transmitting said set of voice frames, wherein said additional capacity exists if additional transmit power is available while said voice frames are being transmitted.

13. A system for conducting wireless communications comprising:

means for generating a set of data frames and a set of voice frames; and means for transmitting said set of voice frames and for transmitting at least a portion of said set of data frames when additional capacity exists, without interfering with transmitting said set of voice frames, wherein said means for transmitting is further for indicating a first time additional capacity to said means for generating, and said means for generating is for setting said set of data frames to have an amount of data equal to said first time additional capacity.

14. A system for conducting wireless communications comprising:

means for generating a set of data frames and a set of voice frames; and means for transmitting said set of voice frames and for transmitting at least a portion of said set of data frames when additional capacity exists, without interfering with transmitting said set of voice frames, wherein said means for transmitting transmits a portion of said set of voice frames if a second time additional capacity is less than an amount of transmit power necessary to transmit all of said set of data frames.

15. The system as set forth in claim 14 wherein said means for transmitting notifies said means for generating of a portion of said set of voice frames that were not transmitted.

16. A system for conducting wireless communications comprising:

means for generating a set of data frames and a set of voice frames; and means for transmitting said set of voice frames and for transmitting at least a portion of said set of data frames when additional capacity exists, without interfering with transmitting said set of voice frames, wherein said means for transmitting and said means for generating are coupled via a wireline connection.

17. A base station for conducting wireless communications comprising:

means for generating a set of data frames and a set of voice frames;

means for transmitting said set of voice frames and for transmitting at least a portion of said set of data frames when additional capacity exists, without interfering with transmitting said set of voice frames; and means for transferring a voice transmit power value from the base station to a base station controller.

18. A method for performing wireless communications using a device having a transmit power threshold, the method comprising:

a) transmitting voice information at a voice transmit power $P_{voice}$; and b) transmitting data at a data transmit power if the voice transmit power ($P_{voice}$) plus the data transmit power is less than or equal to the transmit power threshold ($P_{max}$), and wherein the data transmit power is substantially $P_{max}-P_{voice}$, comprising:

b1) receiving a set of data frames;

b2) calculating an amount of power necessary to transmit all of said set of data frames;

b3) transmitting all of said data frames if said amount of power is less than $P_{max}-P_{voice}$; and b4) transmitting a portion of said data frames if said amount of power is greater than $P_{max}-P_{voice}$.

19. A system for performing wireless communications having a transmit power threshold, the system comprising:

a) a base station controller configured to generate voice information at a voice transmit power, $P_{voice}$; and data information; and b) a base station configured to transmit data at a data transmit power if the voice transmit power ($P_{voice}$) plus the data transmit power is less than or equal to the transmit power threshold ($P_{max}$), and wherein the data transmit power is substantially $P_{max}-P_{voice}$, comprising:

b1) means for receiving a set of data frames;

b2) means for calculating an amount of power necessary to transmit all of said set of data frames;

b3) means for transmitting all of said data frames if said amount of power is less than $P_{max}-P_{voice}$; and b4) means for transmitting a portion of said data frames if said amount of power is greater than $P_{max}-P_{voice}$.

20. A system for performing wireless communications having a transmit power threshold, the system comprising:

a) means for generating voice information at a voice transmit power, $P_{voice}$, and data information; and b) means for transmitting data at a data transmit power if the voice transmit power ($P_{voice}$) plus the data transmit power is less than or equal to the transmit power threshold ($P_{max}$), and wherein the data transmit power is substantially $P_{max}-P_{voice}$, comprising:

b1) means for receiving a set of data frames;
b2) means for calculating an amount of power necessary to transmit all of said set of data frames;
b3) means for transmitting all of said data frames if said amount of power is less than $P_{max}-P_{voice}$; and
b4) means for transmitting a portion of said data frames if said amount of power is greater than $P_{max}-P_{voice}$.

21. A computer readable medium embodying a method for performing wireless communications having a transmit power threshold, the method comprising:

a) transmitting voice information at a voice transmit power $P_{voice}$; and
b) transmitting data at a data transmit power if the voice transmit power ($P_{voice}$) plus the data transmit power is less than or equal to the transmit power threshold ($P_{max}$), and wherein the data transmit power is substantially $P_{max}-P_{voice}$, comprising:

b1) receiving a set of data frames;
b2) calculating an amount of power necessary to transmit all of said set of data frames;
b3) transmitting all of said data frames if said amount of power is less than $P_{max}-P_{voice}$; and
b4) transmitting a portion of said data frames if said amount of power is greater than $P_{max}-P_{voice}$.

* * * * *